US011888766B2

(12) United States Patent
Yang et al.

(10) Patent No.: US 11,888,766 B2
(45) Date of Patent: *Jan. 30, 2024

(54) UPLINK TRANSMISSION COLLISION MANAGEMENT

(71) Applicant: QUALCOMM Incorporated, San Diego, CA (US)

(72) Inventors: Wei Yang, San Diego, CA (US); Yi Huang, San Diego, CA (US); Peter Gaal, San Diego, CA (US); Renqiu Wang, San Diego, CA (US); Linhai He, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,161

(22) Filed: Feb. 22, 2021

(65) Prior Publication Data

US 2021/0184806 A1    Jun. 17, 2021

Related U.S. Application Data

(63) Continuation of application No. 16/274,437, filed on Feb. 13, 2019, now Pat. No. 10,951,366.
(Continued)

(51) Int. Cl.
*H04W 4/00*          (2018.01)
*H04L 5/00*          (2006.01)
(Continued)

(52) U.S. Cl.
CPC ............ *H04L 5/001* (2013.01); *H04L 1/0693* (2013.01); *H04W 74/04* (2013.01);
(Continued)

(58) Field of Classification Search
CPC .............. H04W 72/042; H04W 76/27; H04W 72/0446; H04W 74/04; H04W 74/085;
(Continued)

(56) References Cited

U.S. PATENT DOCUMENTS 6,496,490 B1 * 12/2002 Andrews ............... H04W 16/10
                                                                 455/450
8,429,019 B1 *  4/2013 Yeatts .................. G06Q 10/083
                                                                 705/26.1
(Continued)

FOREIGN PATENT DOCUMENTS

CN       107534984 A      1/2018
CN       107623951 A      1/2018
(Continued)

OTHER PUBLICATIONS

International Search Report and Written Opinion—PCT/US2019/018012—ISA/EPO—dated Apr. 11, 2019.
(Continued)

*Primary Examiner* — Atique Ahmed
(74) *Attorney, Agent, or Firm* — Harrity & Harrity, LLP

(57) ABSTRACT

Various aspects of the present disclosure generally relate to wireless communication. In some aspects, a user equipment may identify, when using carrier aggregation and a plurality of component carrier groups, first traffic associated with a first service type and second traffic associated with a second service type for concurrent transmission. The user equipment may transmit, concurrently, the first traffic associated with the first service type using a first component carrier group of the plurality of component carrier groups, and the second traffic associated with the second service type using a second component carrier group of the plurality of component carrier groups. Numerous other aspects are provided.

30 Claims, 8 Drawing Sheets

Related U.S. Application Data

(60) Provisional application No. 62/710,306, filed on Feb. 16, 2018.

(51) Int. Cl.
*H04W 76/15* (2018.01)
*H04L 1/06* (2006.01)
*H04W 74/04* (2009.01)
*H04W 74/08* (2009.01)
*H04W 72/08* (2009.01)

(52) U.S. Cl.
CPC ......... *H04W 74/085* (2013.01); *H04W 76/15* (2018.02); *H04W 72/08* (2013.01)

(58) Field of Classification Search
CPC ..... H04W 76/15; H04W 72/08; H04W 72/54; H04L 5/0053; H04L 5/0007; H04L 5/001; H04L 1/0693
See application file for complete search history.

(56) References Cited

U.S. PATENT DOCUMENTS

| | | | | |
|---|---|---|---|---|
| 9,226,277 | B2* | 12/2015 | Nakashima | H04W 72/21 |
| 2005/0047259 | A1* | 3/2005 | Ahn | H04L 5/0062 |
| | | | | 365/232 |
| 2010/0271970 | A1* | 10/2010 | Pan | H04L 1/0026 |
| | | | | 370/252 |
| 2014/0010125 | A1* | 1/2014 | Tillman | H04B 7/2643 |
| | | | | 370/280 |
| 2015/0289211 | A1 | 10/2015 | Lee et al. | |
| 2015/0319753 | A1* | 11/2015 | Chen | H04L 5/001 |
| | | | | 370/329 |
| 2017/0302412 | A1* | 10/2017 | Guan | H04L 1/1607 |
| 2017/0347326 | A1* | 11/2017 | Dinan | H04W 52/143 |
| 2018/0019838 | A1 | 1/2018 | Yeo et al. | |
| 2018/0027549 | A1* | 1/2018 | Wang | H04L 5/0044 |
| | | | | 370/329 |
| 2018/0035332 | A1* | 2/2018 | Agiwal | H04W 72/1247 |
| 2018/0199314 | A1* | 7/2018 | Takeda | H04W 72/04 |
| 2018/0212743 | A1* | 7/2018 | Dinan | H04W 72/21 |
| 2018/0263048 | A1 | 9/2018 | Ingale et al. | |
| 2018/0279291 | A1* | 9/2018 | Tiirola | H04L 25/0224 |
| 2018/0323909 | A1 | 11/2018 | Ying et al. | |
| 2019/0109677 | A1* | 4/2019 | Wang | H04L 5/1469 |
| 2019/0191328 | A1* | 6/2019 | Dinan | H04W 52/42 |
| 2019/0223170 | A1* | 7/2019 | Deng | H04L 5/00 |
| 2019/0246412 | A1* | 8/2019 | Noh | H04L 5/0032 |
| 2019/0254067 | A1 | 8/2019 | Al-Imari et al. | |
| 2019/0260523 | A1 | 8/2019 | Yang et al. | |
| 2019/0280802 | A1 | 9/2019 | Ma et al. | |

FOREIGN PATENT DOCUMENTS

| | | |
|---|---|---|
| EP | 3270534 A1 | 1/2018 |
| TW | 201735555 A | 10/2017 |
| WO | 2017051236 A1 | 3/2017 |

OTHER PUBLICATIONS

International Preliminary Report on Patentability—PCT/US2019/018012, The International Bureau of WIPO—Geneva, Switzerland, dated Aug. 27, 2020.
Taiwan Search Report—TW108104940—TIPO—dated Mar. 31, 2022.

* cited by examiner

UPLINK TRANSMISSION COLLISION MANAGEMENT

CROSS-REFERENCE TO RELATED APPLICATIONS UNDER 35 U.S.C. § 119

This application is a continuation of U.S. patent application Ser. No. 16/274,437, filed Feb. 13, 2019, entitled "UPLINK TRANSMISSION COLLISION MANAGEMENT," which claims priority to U.S. Provisional Patent Application No. 62/710,306, filed on Feb. 16, 2018, entitled "TECHNIQUES AND APPARATUSES FOR UPLINK TRANSMISSION COLLISION MANAGEMENT," which are hereby expressly incorporated by reference herein.

INTRODUCTION

Aspects of the present disclosure generally relate to wireless communication, and more particularly to techniques and apparatuses for uplink transmission collision management.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include identifying, when using carrier aggregation and a plurality of component carrier groups, first traffic associated with a first service type and second traffic associated with a second service type for concurrent transmission. The method may include transmitting, concurrently, the first traffic associated with the first service type using a first component carrier group of the plurality of component carrier groups, and the second traffic associated with the second service type using a second component carrier group of the plurality of component carrier groups.

In some aspects, a user equipment for wireless communication may include memory and one or more processors operatively coupled to the memory. The memory and the one or more processors may be configured to identify, when using carrier aggregation and a plurality of component carrier groups, first traffic associated with a first service type and second traffic associated with a second service type for concurrent transmission. The memory and the one or more processors may be configured to transmit, concurrently, the first traffic associated with the first service type using a first component carrier group of the plurality of component carrier groups, and the second traffic associated with the second service type using a second component carrier group of the plurality of component carrier groups.

In some aspects, a non-transitory computer-readable medium may store one or more instructions for wireless communication. The one or more instructions, when executed by one or more processors of a user equipment, may cause the one or more processors to identify, when using carrier aggregation and a plurality of component carrier groups, first traffic associated with a first service type and second traffic associated with a second service type for concurrent transmission. The one or more instructions, when executed by the one or more processors of the user equipment, may cause the one or more processors to transmit, concurrently, the first traffic associated with the first service type using a first component carrier group of the plurality of component carrier groups, and the second traffic associated with the second service type using a second component carrier group of the plurality of component carrier groups.

In some aspects, an apparatus for wireless communication may include means for identifying, when using carrier aggregation and a plurality of component carrier groups, first traffic associated with a first service type and second traffic associated with a second service type for concurrent transmission. The apparatus may include means for transmitting, concurrently, the first traffic associated with the first service type using a first component carrier group of the plurality of component carrier groups, and the second traffic associated with the second service type using a second component carrier group of the plurality of component carrier groups.

In some aspects, a method of wireless communication, performed by a base station, may include transmitting, to a user equipment (UE) that is using carrier aggregation and a plurality of component carrier groups, information scheduling first traffic associated with a first service type for a first component carrier group of a plurality of component carrier groups and second traffic associated with a second service type for concurrent transmission in a second component carrier group of the plurality of component carrier groups. The method may include receiving, concurrently, the first traffic associated with the first service type using the first component carrier group and the second traffic associated with the second service type using the second component carrier group.

In some aspects, a base station for wireless communication may include memory and one or more processors operatively coupled to the memory. The memory and the one or more processors may be configured to transmit, to a user equipment (UE) that is using carrier aggregation and a plurality of component carrier groups, information scheduling first traffic associated with a first service type for a first component carrier group of a plurality of component carrier groups and second traffic associated with a second service type for concurrent transmission in a second component carrier group of the plurality of component carrier groups. The memory and the one or more processors may be configured to receive, concurrently, the first traffic associated with the first service type using the first component carrier group and the second traffic associated with the second service type using the second component carrier group.

In some aspects, a non-transitory computer-readable medium may store one or more instructions for wireless communication. The one or more instructions, when executed by one or more processors of a base station, may cause the one or more processors to transmit, to a user equipment (UE) that is using carrier aggregation and a plurality of component carrier groups, information scheduling first traffic associated with a first service type for a first component carrier group of a plurality of component carrier groups and second traffic associated with a second service type for concurrent transmission in a second component carrier group of the plurality of component carrier groups. The one or more instructions, when executed by the one or more processors of the base station, may cause the one or more processors to receive, concurrently, the first traffic associated with the first service type using the first component carrier group and the second traffic associated with the second service type using the second component carrier group.

In some aspects, an apparatus for wireless communication may include means for transmitting, to a user equipment (UE) that is using carrier aggregation and a plurality of component carrier groups, information scheduling first traffic associated with a first service type for a first component carrier group of a plurality of component carrier groups and second traffic associated with a second service type for concurrent transmission in a second component carrier group of the plurality of component carrier groups. The apparatus may include means for receiving, concurrently, the first traffic associated with the first service type using the first component carrier group and the second traffic associated with the second service type using the second component carrier group.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
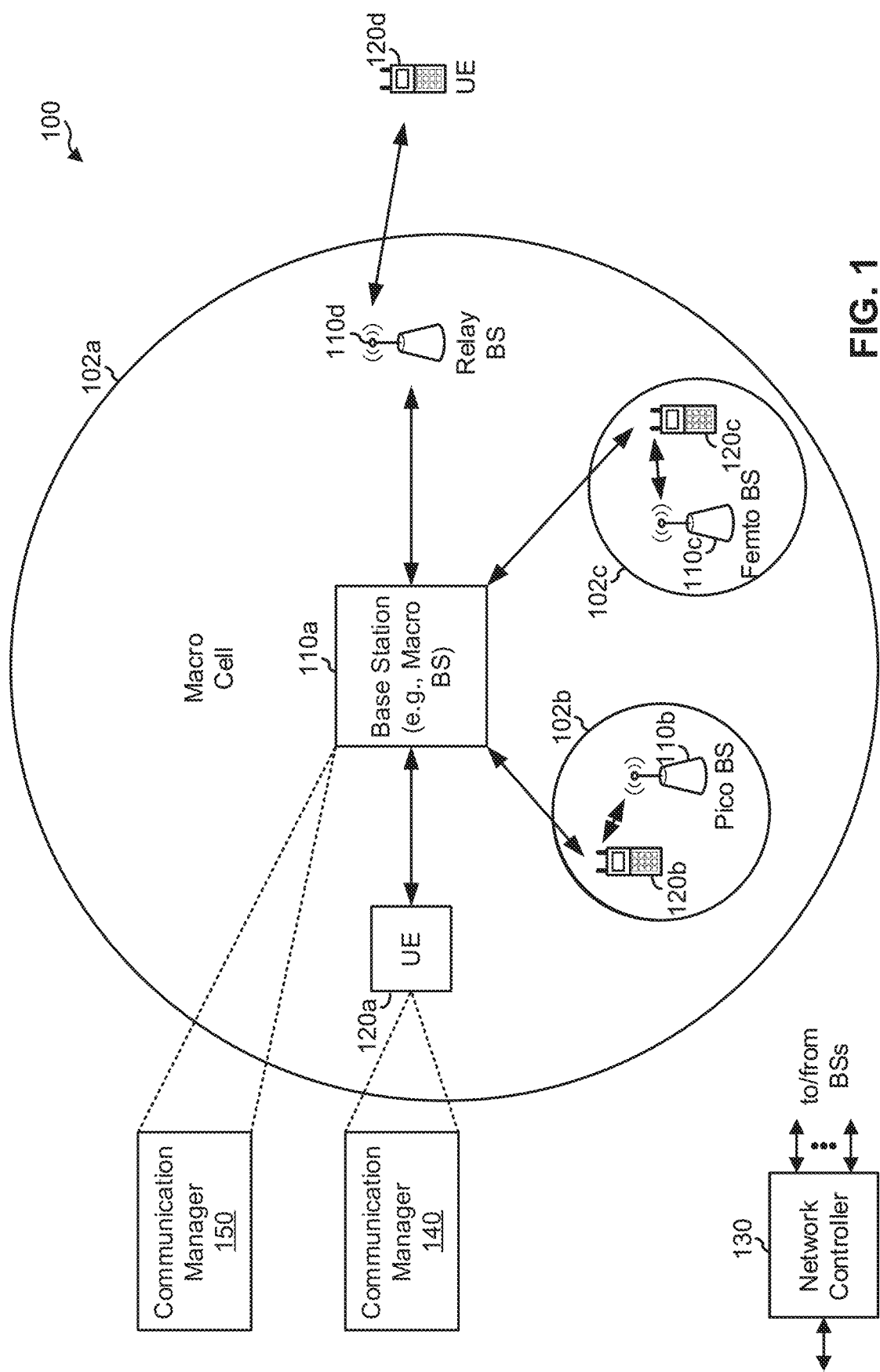
FIG. 1 is a block diagram conceptually illustrating an example of a wireless communication network, in accordance with various aspects of the present disclosure.

A user equipment (UE) may communicate with a base station (BS) using a component carrier in a carrier aggregation scenario. For example, the UE may transmit traffic associated with a physical uplink control channel (PUCCH), a physical uplink shared channel (PUSCH), and/or the like. In some cases, the UE may transmit traffic associated with a particular service type, such as traffic associated with an enhanced mobile broadband (eMBB) service, an ultra-reliable low latency communication (URLLC) service, and/or the like.

However, the UE may be scheduled for a plurality of concurrent transmissions for a plurality of service types. For example, when performing frequency division multiplexing (FDM), the UE may be scheduled to transmit a first PUCCH and a second PUCCH concurrently. Similarly, the UE may be scheduled to transmit a PUSCH and a PUCCH concurrently. Similarly, the UE may be scheduled to transmit a first PUSCH and a second PUSCH concurrently. In this case, delaying one or more of the plurality of transmissions to avoid concurrent transmission may result in a violation of a requirement of a particular service type. For example, eMBB, URLLC, and/or the like may be associated with particular scheduling requirements, delay requirements, and/or the like that may prevent the UE from delaying transmission of data to avoid concurrent transmission.

The UE may attempt to transmit a plurality of transmissions associated with a plurality of service types concurrently using a single component carrier to avoid an interruption to services of the plurality of service types. However, concurrent transmissions associated with the plurality of service types may result in an uplink transmission collision between the concurrent transmissions, and the concurrent transmissions may experience inter-modulation distortion (e.g., based at least in part on the UE including only a single power amplifier for the single component carrier), which may result in a failure of the BS to successfully receive and/or decode the concurrent transmissions.

Some aspects, described herein, may provide uplink transmission collision management. For example, a UE may determine that the UE is scheduled to transmit a plurality of transmissions associated with a plurality of service types in a carrier aggregation scenario, and may separate the plurality of service types into a plurality of component carriers for transmission via the plurality of component carriers. In this case, the UE may transmit the plurality of transmissions, concurrently, using the plurality of component carriers. In this way, the UE may avoid inter-modulation distortion, thereby improving network performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network, a 5G or NR network, and/or the like. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120 may include a communication manager 140. As described in more detail elsewhere herein, the communication manager 140 may identify, when using carrier aggregation and a plurality of component carriers, first traffic associated with a first service type and second traffic associated with a second service type for concurrent transmission; transmit, concurrently, the first traffic associated with the first service type using a first component carrier of the plurality of component carriers, and the second traffic associated with the second service type using a second component carrier of the plurality of component carriers; and/or the like. Additionally, or alternatively, the communication manager 140 may perform one or more other operations described herein.

As shown in FIG. 1, the BS 110 may include a communication manager 150. As described in more detail elsewhere herein, the communication manager 150 may transmit, to a user equipment (UE) that is using carrier aggregation and a plurality of component carriers, information scheduling first traffic associated with a first service type for a first component carrier group of a plurality of component carrier groups and second traffic associated with a second service type for concurrent transmission in a second component carrier group of the plurality of component carrier groups; receive, concurrently, the first traffic associated with the first service type using the first component carrier group and the second traffic associated with the second service type using the second component carrier group; and/or the like. Additionally, or alternatively, the communication manager 150 may perform one or more other operations described herein.

As indicated above, FIG. 1 is provided merely as an example. Other examples may differ from what is described with regard to FIG. 1.

Figure 2:
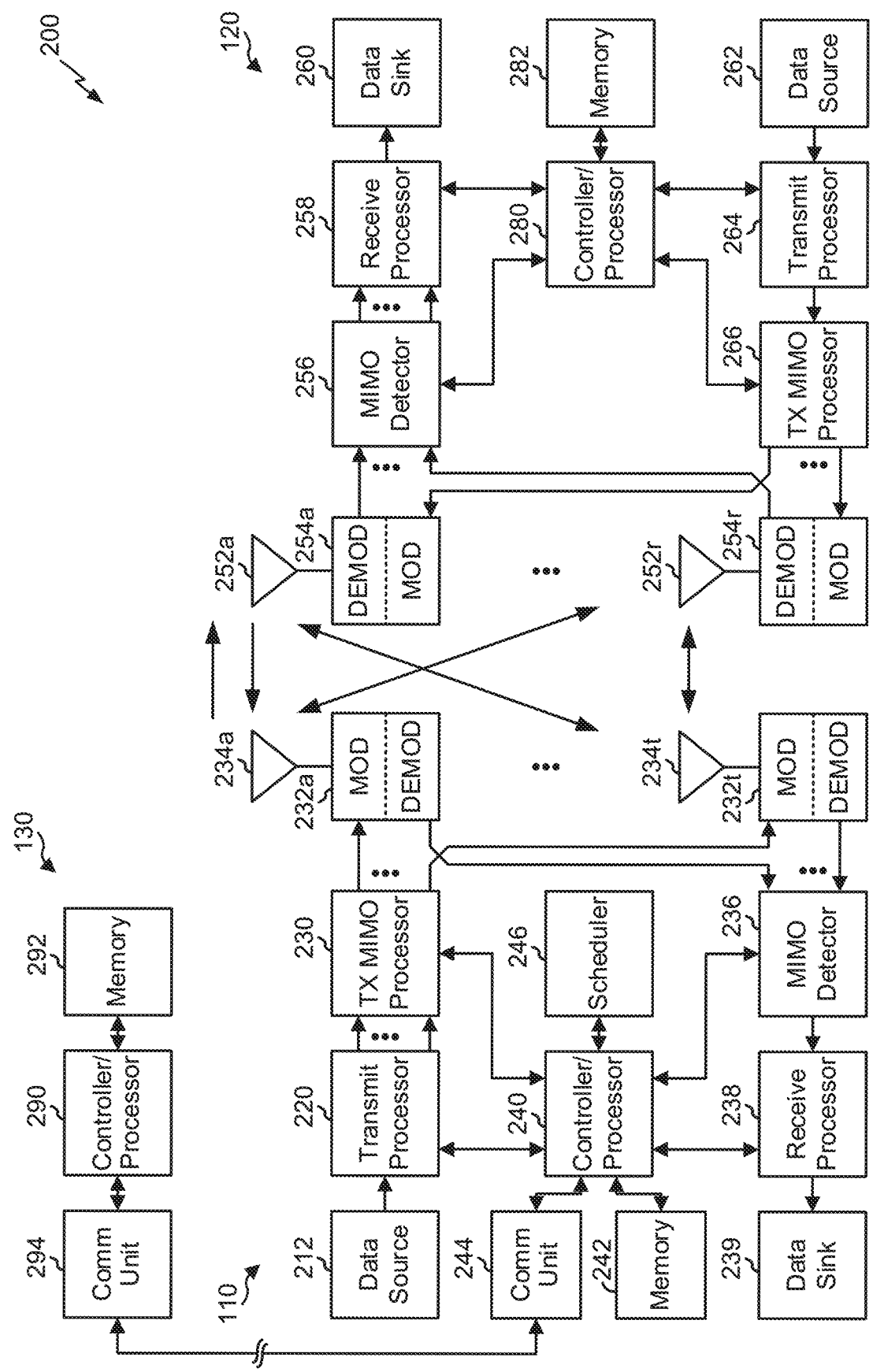
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system formation (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with uplink transmission collision management, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include means for identifying, when using carrier aggregation and a plurality of component carrier groups, first traffic associated with a first service type and second traffic associated with a second service type for concurrent transmission, means for transmitting, concurrently, the first traffic associated with the first service type using a first component carrier group of the plurality of component carrier groups, and the second traffic associated with the second service type using a second component carrier group of the plurality of component carrier groups, and/or the like. Additionally, or alternatively, the UE 120 may include means for performing one or more other operations described herein. In some aspects, such means may include the communication manager 140. Additionally, or alternatively, such means may include one or more components of the UE 120 described in connection with FIG. 2.

In some aspects, base station 110 may include means for transmitting, to a user equipment (UE) that is using carrier aggregation and a plurality of component carrier groups, information scheduling first traffic associated with a first service type for a first component carrier group of a plurality of component carrier groups and second traffic associated with a second service type for concurrent transmission in a second component carrier group of the plurality of component carrier groups, means for receiving, concurrently, the first traffic associated with the first service type using the first component carrier group and the second traffic associated with the second service type using the second component carrier group, and/or the like. Additionally, or alternatively, the BS 110 may include means for performing one or more other operations described herein. In some aspects, such means may include the communication manager 150. Additionally, or alternatively, such means may include one or more components of the BS 110 described in connection with FIG. 2.

As indicated above, FIG. 2 is provided merely as an example. Other examples may differ from what is described with regard to FIG. 2.

Figure 3A:
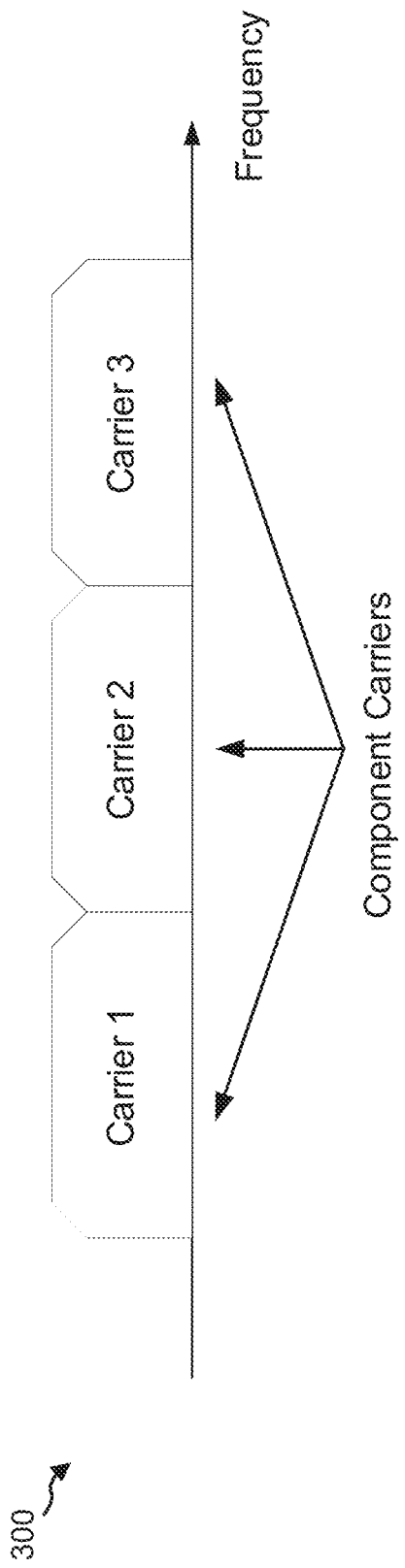
FIGS. 3A-3C are diagrams illustrating examples of carrier aggregation, in accordance with various aspects of the present disclosure.
Figure 3B:
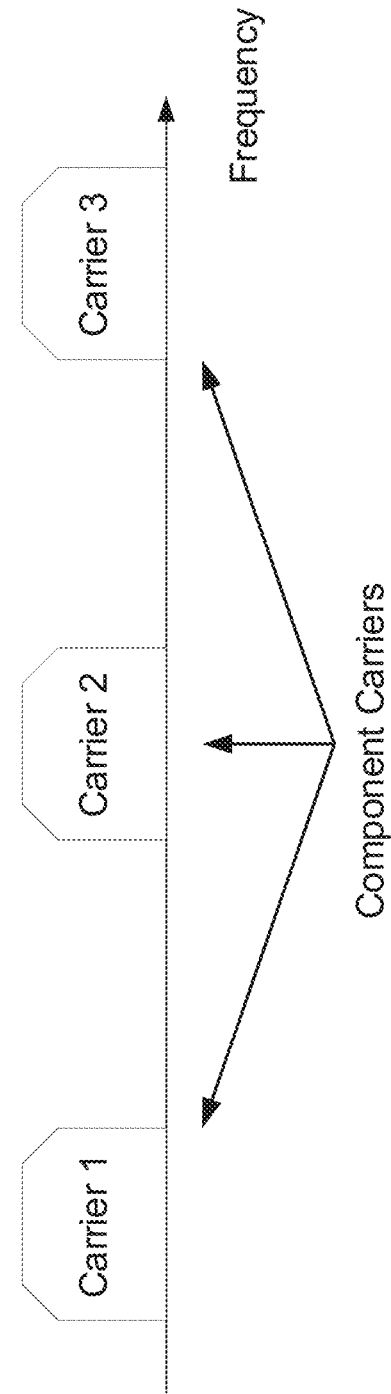
Figure 3C:
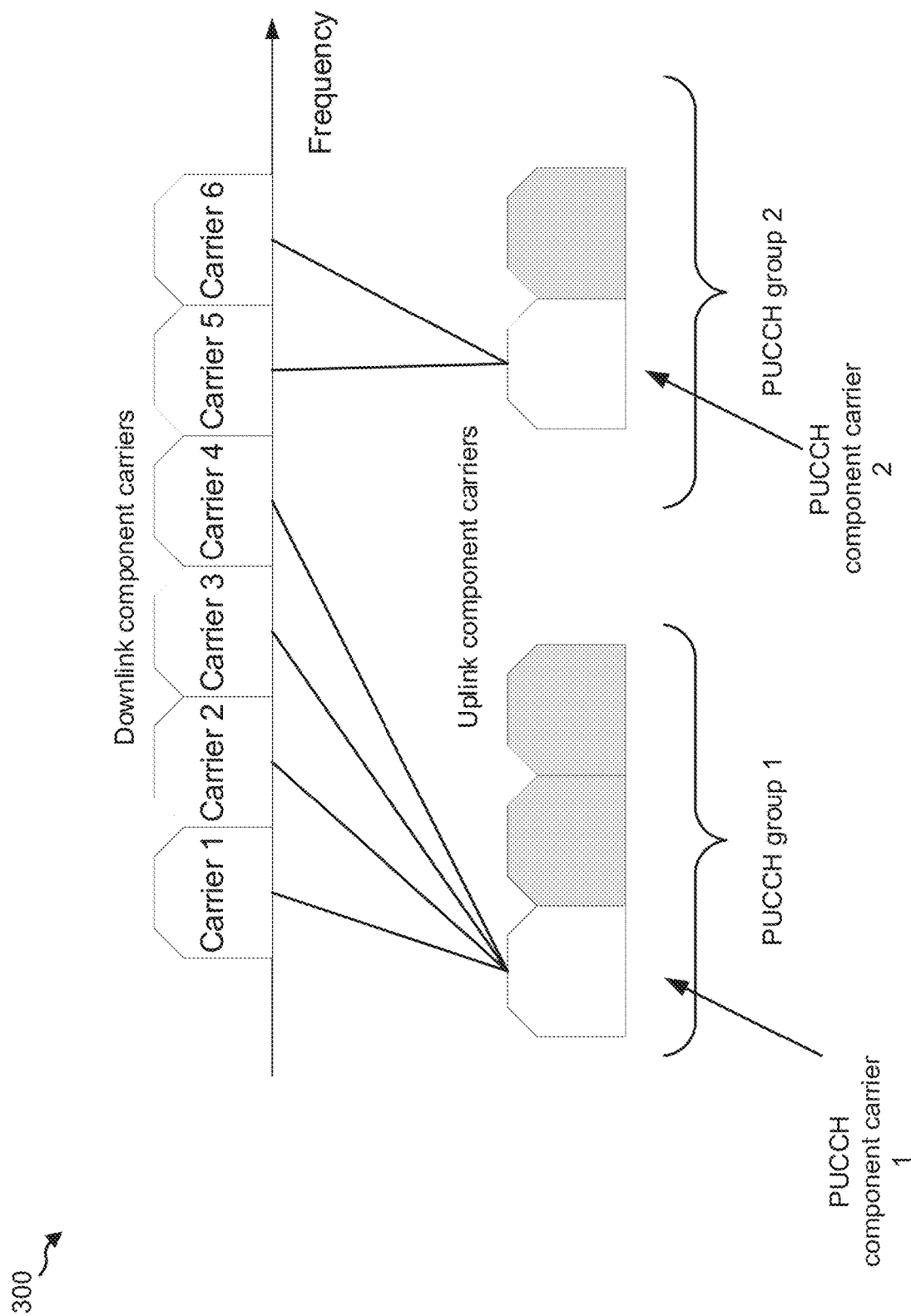

FIGS. 3A-3C show a diagram 300 of carrier aggregation, in accordance with various aspects of the present disclosure.

UEs may use spectrum up to threshold bandwidths allocated in a carrier aggregation of up to a total of a particular bandwidth (based at least in part on the quantity of component carriers) used for transmission in each direction. Generally, less traffic is transmitted on the uplink than the downlink, so the uplink spectrum allocation may be smaller than the downlink allocation. For example, if a first threshold bandwidth is assigned to the uplink, the downlink may be assigned a second threshold bandwidth that is greater than the first threshold bandwidth. These asymmetric frequency division duplexed (FDD) assignments conserve spectrum and are a good fit for the typically asymmetric bandwidth utilization by broadband subscribers.

Two example types of carrier aggregation (CA) methods are described herein, continuous CA and non-continuous CA; however other types of CA methods are possible that differ from the two types described herein. The two types of CA methods are illustrated in FIG. 3A and FIG. 3B. As shown in FIG. 3A, continuous CA occurs when multiple available component carriers are adjacent to each other. As shown in FIG. 3B, non-continuous CA occurs when multiple available component carriers are separated along the frequency band. Both non-continuous and continuous CA aggregates multiple component carriers to serve a single UE.

In some aspects, multiple UEs may share a component carrier. For example, a first UE may transmit first data using the component carrier, and a second UE may subsequently transmit second data using the component carrier. In some aspects, the first data and the second data may be associated with different service types. In some aspects, a plurality of component carriers may be grouped. For example, as shown in FIG. 3C, for enhanced carrier aggregation (eCA), a PUCCH group may include a plurality of component carriers, and a network may include a plurality of PUCCH groups. In this case, each PUCCH group may include at least one component carrier for a PUCCH transmission (termed a PUCCH carrier) and at least one other component carrier for a non-PUCCH transmission (termed a non-PUCCH carrier) (e.g., for another kind of transmission, such as a PUSCH transmission). In some aspects, the PUCCH carrier may convey non-PUCCH data. For example, a PUSCH may be conveyed using a PUCCH carrier, a non-PUCCH carrier, and/or the like. In contrast, a PUCCH may be conveyed only using the PUCCH carrier, in some aspects.

As further shown in FIG. 3C, PUCCH group 1 may include PUCCH component carrier 1. PUCCH component carrier 1 may convey acknowledgment (ACK) feedback, negative acknowledgment (NACK) feedback, a channel state information (CSI) message (e.g., for downlink traffic associated with a first set of downlink component carriers), and/or the like. Similarly, PUCCH component carrier 2 of PUCCH group 2 may convey ACK feedback, NACK feedback, a CSI message (e.g., for downlink traffic associated with a second set of downlink component carriers), and/or the like.

As indicated above, FIGS. 3A-3C are provided merely as examples. Other examples may differ from what is described with regard to FIGS. 3A-3C.

Figure 4:
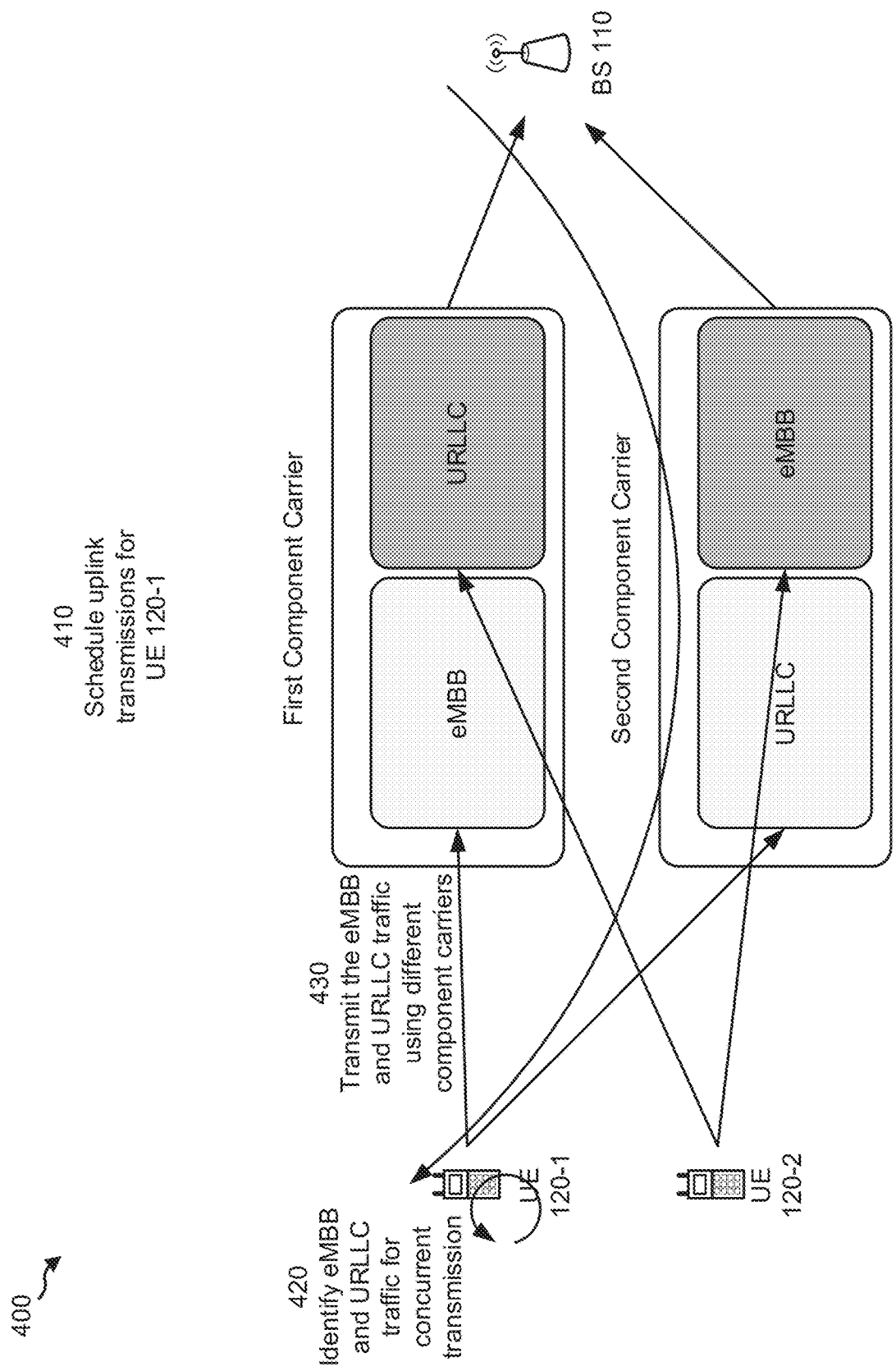
FIG. 4 is a diagram illustrating an example of uplink transmission collision management, in accordance with various aspects of the present disclosure.

FIG. 4 is a diagram illustrating an example 400 of uplink transmission collision management, in accordance with various aspects of the present disclosure. As shown in FIG. 4, example 400 includes a BS 110 communicating with a plurality of UEs 120 (shown as UE 120-1 and UE 120-2).

As further shown in FIG. 4, and by reference number 410, BS 110 may schedule uplink transmissions for UE 120-1. For example, BS 110 may provide a grant indicating that UE 120-1 is to transmit first traffic associated with a first service type (e.g., eMBB) and second traffic associated with a second service type (e.g., URLLC), concurrently. In some aspects, BS 110 may schedule the uplink transmissions for a single component carrier. For example, BS 110 may indicate that the first traffic and the second traffic are to be transmitted using a single component carrier. In this case, UE 120 may alter the schedule to cause the uplink transmissions to be provided via a plurality of component carriers, may reject the scheduling of BS 110, may determine that that scheduling is in error, and/or the like.

Additionally, or alternatively, BS 110 may schedule the uplink transmissions for a plurality of component carriers, such as for a first component carrier, a second component carrier, and/or the like. In some aspects, the uplink transmissions may be related to a plurality of different types of channels. For example, BS 110 may schedule a first uplink transmission associated with a PUCCH and a second uplink transmission associated with a PUSCH. Additionally, or alternatively, the uplink transmissions may be related to a single type of channel for a plurality of service types (e.g., eMBB, URLLC, and/or the like). For example, BS 110 may schedule a first PUCCH transmission and a second PUCCH transmission to occur concurrently. Additionally, or alternatively, BS 110 may schedule a first PUSCH transmission and a second PUSCH transmission to occur concurrently.

In some aspects, for traffic associated with a PUSCH, UE 120 may receive dynamic scheduling. For example, BS 110 may dynamically provide scheduling signaling to schedule eMBB traffic for a first component carrier, URLLC traffic for a second component carrier, and/or the like. In some aspects, UE 120 may receive semi-static signaling associated with identifying a scheduling. For example, BS 110 may semi-statically configure UE 120 to transmit traffic associated with eMBB service using the first component carrier and traffic associated with the URLLC service using the second component carrier. In this case, BS 110 may use uplink semi-persistent scheduling (SPS) to configure the eMBB service for the first component carrier, and may use uplink SPS or grant-free contention based scheduling to configure URLLC traffic for the second component carrier. In some aspects, for traffic associated with a PUCCH, UE 120 may receive information associated with semi-statically configuring PUCCH resources for URLLC on a first component carrier and PUCCH resources for eMBB on a second component carrier. In some aspects, BS 110 may transmit a dynamic downlink control information (DCI) message to indicate resources for PUCCH transmissions on at least one of the plurality of component carriers.

As further shown in FIG. 4, and by reference number 420, UE 120-1 may identify traffic associated with a plurality of services for concurrent transmission. For example, UE 120-1 may determine that first traffic associated with an eMBB service and second traffic associated with a URLLC service is to be transmitted concurrently and using the plurality of component carriers. In some aspects, UE 120-1 may determine that the traffic is for concurrent transmission based at least in part on receiving signaling, from BS 110, identifying scheduling information. For example, UE 120-1 may receive signaling identifying a schedule for uplink transmissions, and may determine that uplink traffic associated with a plurality of service types is to be provided concurrently. Additionally, or alternatively, UE 120-1 may determine that the uplink traffic associated with the plurality of services types is to be provided concurrently based at least in part on stored information, a measurement, and/or the like.

In some aspects, UE 120-1 may determine to separate traffic for the plurality of services into a plurality of transmissions using a plurality of component carriers. For example, UE 120-1 may determine to concurrently transmit first traffic associated with an eMBB service using the first component carrier and second traffic associated with a URLLC service using the second component carrier. In some aspects, UE 120 may identify traffic associated with a plurality of channel types, such as PUCCH traffic associated with an eMBB service type and PUSCH traffic associated with a URLLC service type. In some aspects, UE 120 may identify traffic associated with a single channel type and a plurality of service types, such as PUCCH traffic associated with eMBB service and PUCCH traffic associated with URLLC service, PUSCH traffic associated with eMBB service and PUSCH traffic associated with URLLC service, and/or the like. In some aspects, traffic associated with a particular channel may include a plurality of components. For example, UE 120 may determine that traffic associated with a PUSCH channel includes data traffic, uplink control information (UCI) traffic (e.g., an acknowledgment (ACK) message for a downlink transmission, a negative acknowledgment (NACK) message for a downlink transmission, a service request (SR), a channel state information (CSI) feedback message, and/or the like), a combination of data traffic and UCI traffic, and/or the like.

As further shown in FIG. 4, and by reference number 430, UE 120-1 may concurrently transmit the plurality of transmissions of traffic associated with a plurality of services. For example, UE 120-1 may transmit first traffic associated with an eMBB service using the first component carrier and second traffic associated with a URLLC service using the second component carrier. In some aspects, UE 120-1 may reject scheduling from BS 110. For example, when uplink transmissions associated with different services are scheduled concurrently in a common PUCCH group, UE 120-1 may determine not to transmit in accordance with the schedule. In some aspects, UE 120-1 may transmit the first traffic and the second traffic using a plurality of power amplifiers and antennas. For example, UE 120-1 may use a first power amplifier and a first antenna associated with the first component carrier to transmit the first traffic and a second power amplifier and a second antenna associated with the second component carrier to transmit the second traffic. In this way, UE 120-1 enables concurrent transmissions associated with a plurality of service types without causing inter-modulation distortion.

In some aspects, component carrier separation of service types may be UE-specific. For example, UE 120-1 may transmit first traffic associated with an eMBB service using the first component carrier and UE 120-2 may transmit second traffic associated with a URLLC service using the first component carrier. Similarly, UE 120-1 may transmit third traffic associated with a URLLC service using the second component carrier and UE 120-2 may transmit fourth traffic associated with an eMBB service using the second component carrier. In this way, UE 120-1 avoids causing inter-modulation distortion by transmitting transmissions associated with a plurality of service types using a plurality of component carriers rather than a single component carrier.

As indicated above, FIG. 4 is provided as an example. Other examples may differ from what is described with respect to FIG. 4.

Figure 5:
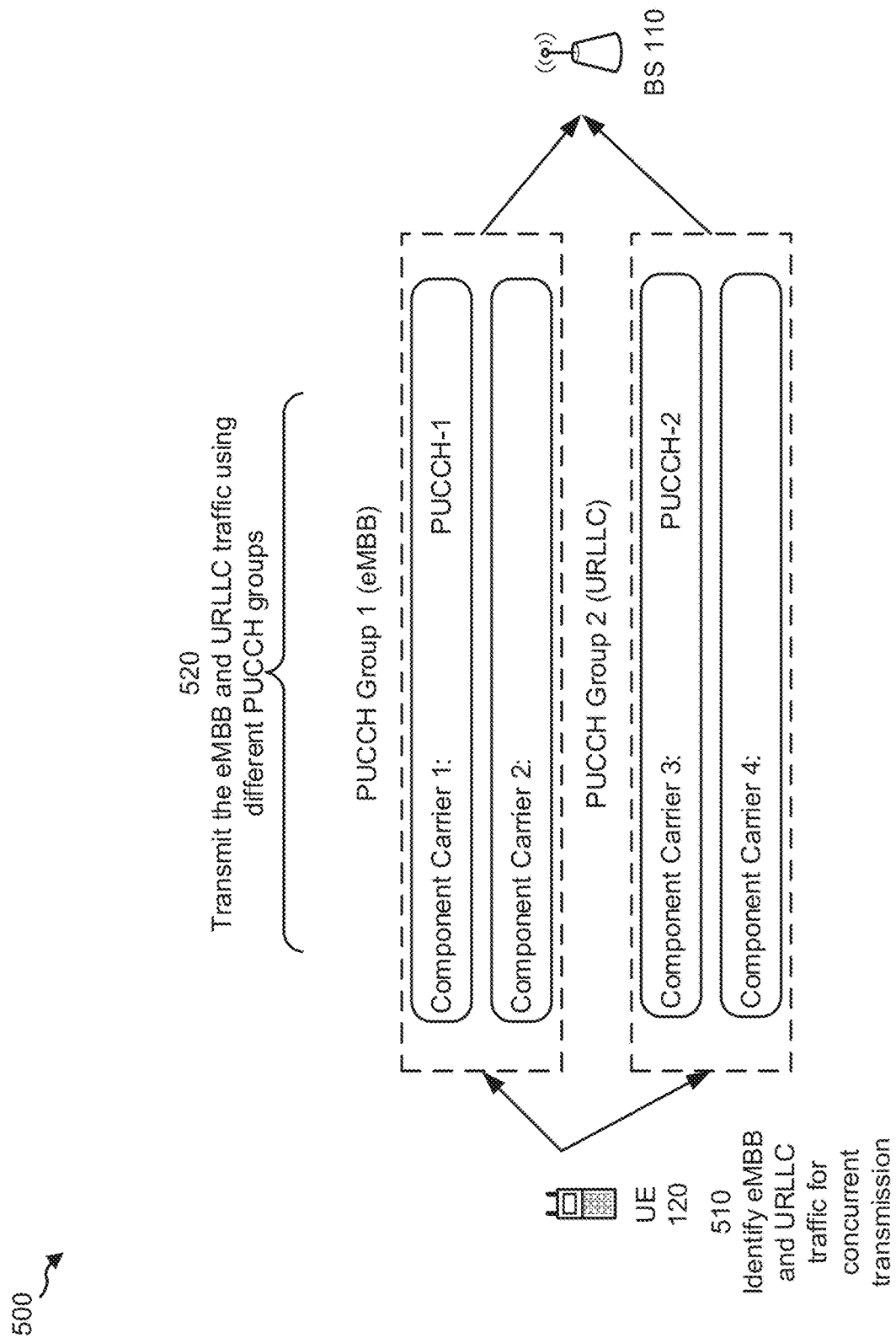
FIG. 5 is a diagram illustrating an example of uplink transmission collision management, in accordance with various aspects of the present disclosure.

FIG. 5 is a diagram illustrating an example 500 of uplink transmission collision management, in accordance with various aspects of the present disclosure. As shown in FIG. 5, example 500 includes a BS 110 communicating with a UE 120.

As further shown in FIG. 5, and by reference number 510, UE 120 may identify eMBB traffic and URLLC traffic for concurrent transmission when operating in a network that supports PUCCH groups of component carriers. For example, UE 120 may determine that UE 120 is to transmit a set of eMMB transmissions (e.g., PUCCH transmissions, PUSCH transmissions, and/or the like) and a set of URLLC transmissions (e.g., PUCCH transmissions, PUSCH transmissions, and/or the like) concurrently in a single PUCCH group of component carriers based at least in part on received signaling from BS 110. In this case, UE 120 may determine to separate the eMBB transmissions into a first PUCCH group and the URLLC transmissions into a second PUCCH group. In this case, BS 110 may schedule first downlink service (e.g., an eMBB PDCCH or PDSCH transmission) in the first set of downlink component carriers, and may schedule second downlink service in the second set of downlink component carriers. As a result, BS 110 may not schedule concurrent downlink transmissions for different services on a same downlink component carrier or on downlink component carriers associated with a same PUCCH carrier.

In some aspects, UE 120 may identify the eMBB traffic and URLLC traffic for concurrent transmission based at least in part on received signaling from BS 110, as described above. In some aspects, each PUCCH group may be associated with a corresponding packet processing timeline. For example, UE 120 may determine to process packets associated with a first PUCCH group based at least in part on a first timeline for processing packets, and may determine to process packets associated with a second PUCCH group based at least in part on a second timeline for processing packets.

As further shown in FIG. 5, and by reference number 520, UE 120 may concurrently transmit traffic associated with a plurality of services using a plurality of component carriers of a plurality of PUCCH groups. For example, UE 120 may transmit, to BS 110 and in PUCCH group 1, eMBB traffic, such as PUCCH traffic via a first component carrier (e.g., a PUCCH component carrier) and non-PUCCH traffic via a second component carrier. In this case, a PUCCH transmission may convey an ACK, a NACK, a CSI, and/or the like for a particular service. Similarly, UE 120 may transmit, to BS 110 and in PUCCH group 2, URLLC traffic, such as PUCCH traffic via a third component carrier (e.g., a PUCCH component carrier) and non-PUCCH traffic via a fourth component carrier. In some aspects, UE 120 may include, in a PUSCH transmission, uplink control information (UCI) associated with a PUCCH transmission. For example, when a PUSCH and a PUCCH for a common service are scheduled concurrently, UE 120 may include UCI for the PUCCH in the PUSCH transmission. However, as UE 120 may reject scheduling of different services scheduled concurrently, as described above, UE 120 may not include a URLLC UCI in an eMBB PUSCH, an eMBB UCI in a URLLC PUSCH, and/or the like.

In this way, UE 120 uses a plurality of PUCCH groups for concurrent transmission of traffic associated with a plurality of services without causing inter-modulation distortion, thereby improving network performance. In some aspects, other UEs 120 may transmit other traffic using the PUCCH groups. For example, another UE 120 may transmit URLLC traffic in PUCCH group 1 to BS 110 and eMBB traffic in PUCCH group 2 to BS 110.

As indicated above, FIG. 5 is provided as an example. Other examples may differ from what is described with respect to FIG. 5.

Figure 6:
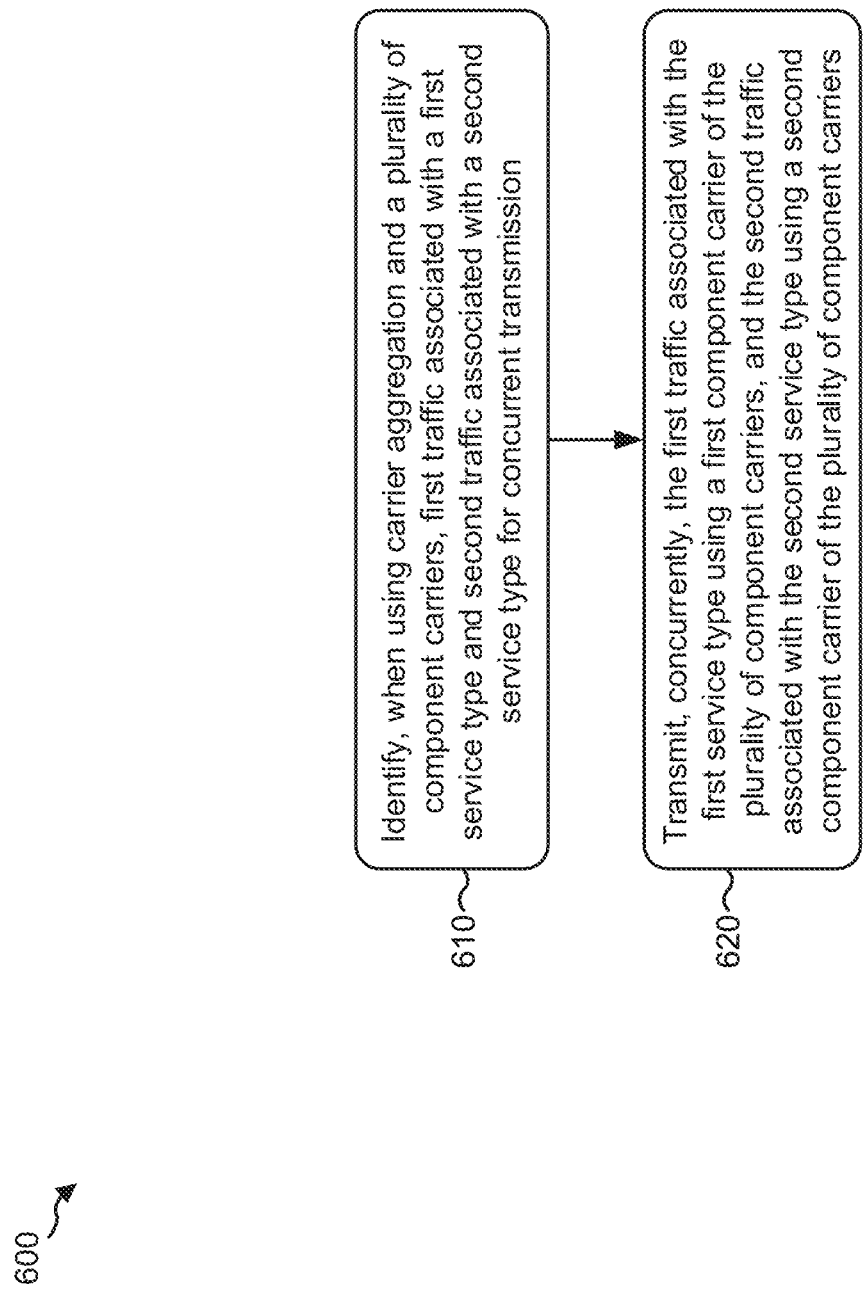
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs uplink transmission collision management.

As shown in FIG. 6, in some aspects, process 600 may include identifying, when using carrier aggregation and a plurality of component carrier groups, first traffic associated with a first service type and second traffic associated with a second service type for concurrent transmission (block 610). For example, the UE (e.g., using receive processor 258, controller/processor 280, transmit processor 264, and/or the like) may identify, when using carrier aggregation and a plurality of component carrier groups, first traffic associated with a first service type and second traffic associated with a second service type for concurrent transmission, as described above.

As shown in FIG. 6, in some aspects, process 600 may include transmitting, concurrently, the first traffic associated with the first service type using a first component carrier group of the plurality of component carrier groups, and the second traffic associated with the second service type using a second component carrier group of the plurality of component carrier groups (block 620). For example, the UE (e.g., using transmit processor 264, TX MIMO processor 266, modulator 254, antenna 252, and/or the like) may transmit, concurrently, the first traffic associated with the first service type using a first component carrier group of the plurality of component carrier groups, and the second traffic associated with the second service type using a second component carrier group of the plurality of component carrier groups, as described above.

Process 600 may include additional aspects, such as any single aspect or any combination of aspects described below.

With respect to process 600, in some aspects, the first service type is enhanced mobile broadband traffic and the second service type is ultra-reliable low latency communication traffic. With respect to process 600, in some aspects, the UE is configured to transmit the first traffic associated with the first service type using the first component carrier group and the second traffic associated with the second service type using the second component carrier group based at least in part on received signaling. With respect to process 600, in some aspects, the received signaling is dynamic signaling indicating that the first traffic is scheduled for the first component carrier group and the second traffic is scheduled for the second component carrier group.

With respect to process 600, in some aspects, the received signaling is semi-static signaling indicating that the first service type is scheduled for the first component carrier group and the second service type is scheduled for the second component carrier group. With respect to process 600, in some aspects, the received signaling is associated with at least one of semi-persistent scheduling or grant-free contention scheduling. With respect to process 600, in some aspects, the received signaling includes dynamic signaling indicating that the first traffic is scheduled for the first component carrier group and semi-static signaling indicating that the second service type is scheduled for the second component carrier group. With respect to process 600, in some aspects, the received signaling is a downlink control information message.

With respect to process 600, in some aspects, the first traffic and the second traffic are one of a physical uplink control channel (PUCCH) and a physical uplink shared channel (PUSCH), a first PUCCH and a second PUCCH, a first PUSCH and a second PUSCH, and/or the like. With respect to process 600, in some aspects, the first traffic or the second traffic is a physical uplink shared channel that includes at least one of data traffic or uplink control information traffic.

With respect to process 600, in some aspects, the first traffic includes uplink control information associated with at least one of an acknowledgment message for a downlink transmission, a negative acknowledgment message for a downlink transmission, a service request, or a channel state information feedback message. With respect to process 600, in some aspects, the first component carrier group is configured to convey the first traffic associated with the first service type for the user equipment and third traffic associated with a third service type for another user equipment. With respect to process 600, in some aspects, the second component carrier group is configured to convey the second traffic associated with the second service type for the user equipment and fourth traffic associated with a fourth service type for the other user equipment.

With respect to process 600, in some aspects, the first component carrier group is included in a first physical uplink control channel (PUCCH) group of component carrier groups and the second component carrier group is included in a second PUCCH group of component carrier groups. With respect to process 600, in some aspects, the first traffic is a PUCCH traffic and the first component carrier group is a PUCCH component carrier group of the first PUCCH group of component carrier groups, and wherein the second traffic is a non-PUCCH traffic and the second component carrier group is a non-PUCCH component carrier group of the second PUCCH group of component carrier groups. With respect to process 600, in some aspects, the PUCCH component carrier group is configured to convey PUCCH traffic and non-PUCCH traffic. With respect to process 600, in some aspects, the UE is configured to reject a scheduling of the first service type and the second service type for a same component carrier group.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
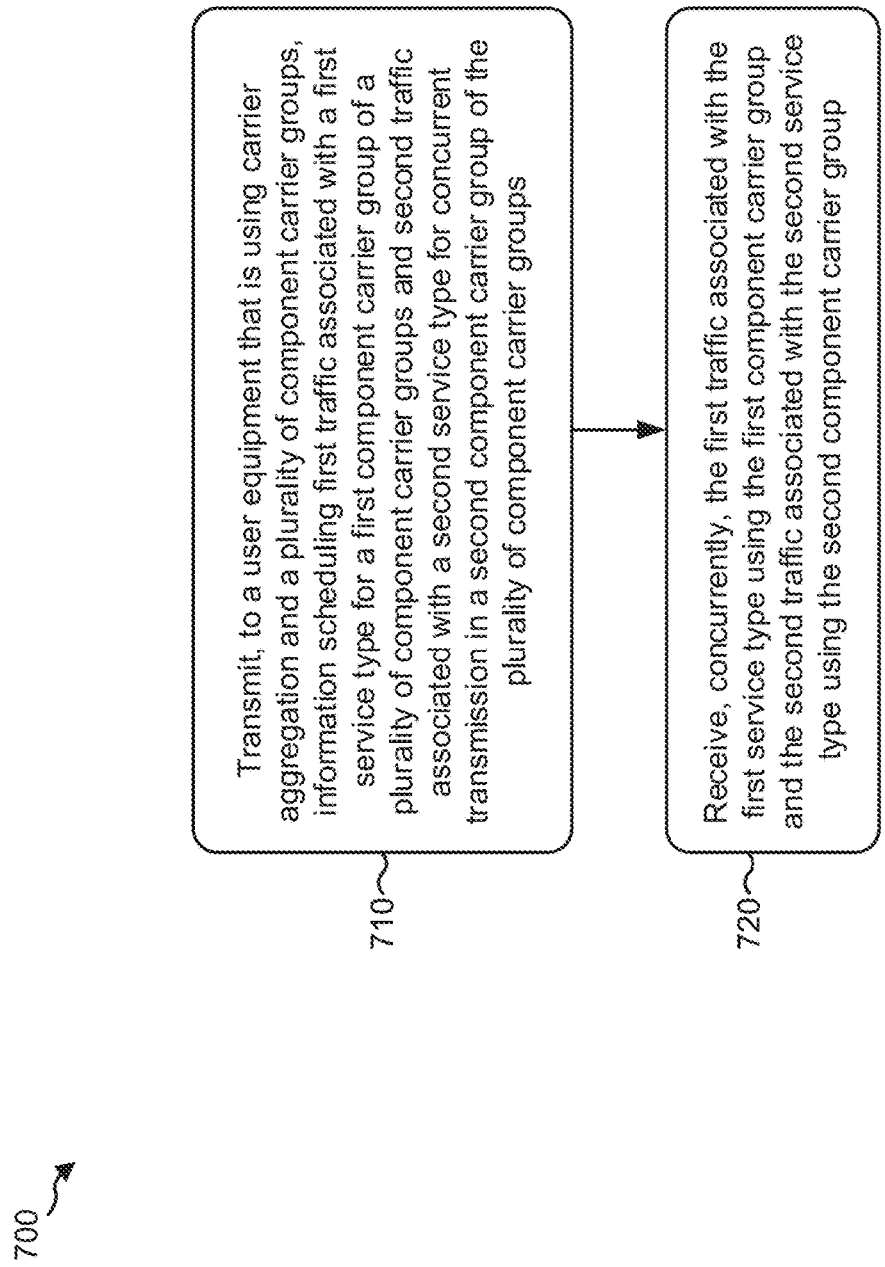
FIG. 7 is a diagram illustrating an example process performed, for example, by a base station, in accordance with various aspects of the present disclosure.

FIG. 7 is a diagram illustrating an example process 700 performed, for example, by a BS, in accordance with various aspects of the present disclosure. Example process 700 is an example where a BS (e.g., BS 110) performs uplink transmission collision management.

As shown in FIG. 7, in some aspects, process 700 may include transmitting, to a user equipment that is using carrier aggregation and a plurality of component carrier groups, information scheduling first traffic associated with a first service type for a first component carrier group of a plurality of component carrier groups and second traffic associated with a second service type for concurrent transmission in a second component carrier group of the plurality of component carrier groups (block 710). For example, the BS (e.g., using controller/processor 240, transmit processor 220, TX MIMO processor 230, MOD 232, antenna 234, and/or the like) may transmit, to a user equipment that is using carrier aggregation and a plurality of component carrier groups, information scheduling first traffic associated with a first service type for a first component carrier group of a plurality of component carrier groups and second traffic associated with a second service type for concurrent transmission in a second component carrier group of the plurality of component carrier groups, as described in more detail above.

As shown in FIG. 7, in some aspects, process 700 may include receiving, concurrently, the first traffic associated with the first service type using the first component carrier group and the second traffic associated with the second service type using the second component carrier group (block 720). For example, the BS (e.g., using antenna 234, DEMOD 232, MIMO detector 236, receive processor 238, controller/processor 240, and/or the like) may receive, concurrently, the first traffic associated with the first service type using the first component carrier group and the second traffic associated with the second service type using the second component carrier group, as described in more detail above.

Process 700 may include additional aspects, such as any single aspect and/or any combination of aspects described below and/or in connection with one or more other processes described elsewhere herein.

With respect to process 700, in some aspects, the first service type is enhanced mobile broadband traffic and the second service type is ultra-reliable low latency communication traffic. With respect to process 700, in some aspects, the information scheduling the first traffic and the second traffic is dynamic signaling indicating that the first traffic is scheduled for the first component carrier group and the second traffic is scheduled for the second component carrier group.

With respect to process 700, in some aspects, the information scheduling the first traffic and the second traffic is semi-static signaling indicating that the first traffic is scheduled for the first component carrier group and the second traffic is scheduled for the second component carrier group. With respect to process 700, in some aspects, the information scheduling the first traffic and the second traffic is associated with at least one of semi-persistent scheduling or grant-free contention scheduling. With respect to process 700, in some aspects, the information scheduling the first traffic and the second traffic includes dynamic signaling indicating that the first traffic is scheduled for the first component carrier group and semi-static signaling indicating that the second service type is scheduled for the second component carrier group.

With respect to process 700, in some aspects, the information scheduling the first traffic and the second traffic is a downlink control information message. With respect to process 700, in some aspects, the first traffic and the second traffic are one of: a physical uplink control channel (PUCCH) and a physical uplink shared channel (PUSCH), a first PUCCH and a second PUCCH, or a first PUSCH and a second PUSCH. With respect to process 700, in some aspects, the first traffic or the second traffic is a physical uplink shared channel that includes at least one of data traffic or uplink control information traffic.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE), comprising:
a memory comprising instructions; and
one or more processors configured to execute the instructions and cause the UE to:
transmit first traffic using a first physical uplink control channel (PUCCH) group; and
transmit second traffic using a second PUCCH group concurrently with transmitting the first traffic using the first PUCCH group,
wherein the first traffic is associated with a first service type, and
wherein the second traffic is associated with a second service type.

2. The user equipment of claim 1,
wherein the first PUCCH group includes one or more first component carriers,
wherein the one or more first component carriers include a first PUCCH component carrier,
wherein the second PUCCH group includes one or more second component carriers, and
wherein the one or more second component carriers include a second PUCCH component carrier.

3. The user equipment of claim 2,
wherein the one or more first component carriers further include a first non-PUCCH component carrier, and
wherein the one or more second component carriers further include a second non-PUCCH component carrier.

4. The user equipment of claim 3,
wherein the carrier traffic is transmitted via the first PUCCH component carrier or the first non-PUCCH component carrier, and
wherein the second traffic is transmitted via the second PUCCH component carrier or the second non-PUCCH component carrier.

5. The user equipment of claim 1, wherein the first traffic is associated with a physical uplink shared channel (PUSCH),
wherein the PUSCH is conveyable using a PUCCH component carrier or using a non-PUCCH component carrier, and
wherein the first traffic is transmitted via the PUCCH component carrier or the non-PUCCH component carrier.

6. The user equipment of claim 1, wherein the first traffic is associated with a PUCCH, and
wherein the PUCCH is conveyable using only PUCCH component carriers.

7. The user equipment of claim 1, wherein the first service type is enhanced mobile broadband (eMBB), and
wherein the second service type is ultra-reliable low latency communication (URLLC).

8. The user equipment of claim 1, wherein the first traffic is associated with a PUCCH, and
wherein the second traffic is associated with a physical uplink shared channel (PUSCH).

9. The user equipment of claim 1, wherein different component carriers are required to schedule the concurrent transmissions of the first traffic and the second traffic.

10. The user equipment of claim 1, wherein the first PUCCH group includes a PUCCH component carrier and a non-PUCCH component carrier, and
wherein the first traffic is transmitted via the PUCCH component carrier or the non-PUCCH component carrier.

11. The UE of claim 1,
wherein the first PUCCH group includes a first component carrier group, and
wherein the second PUCCH group includes a second component carrier group.

12. The UE of claim 11,
wherein the first traffic is a PUCCH traffic that is transmitted via the first component carrier group, and
wherein the first component carrier group is a PUCCH component carrier group.

13. The UE of claim 11,
wherein the second traffic is a non-PUCCH traffic that is transmitted via the second component carrier group, and
wherein the second component carrier group is a non-PUCCH component carrier group.

14. The UE of claim 11,
wherein the first traffic is a PUCCH traffic that is transmitted via the first component carrier group, and
wherein the first component carrier group is a PUCCH component carrier group,
wherein the second traffic is a non-PUCCH traffic that is transmitted via the second component carrier group, and
wherein the second component carrier group is a non-PUCCH component carrier group.

15. The UE of claim 11,
wherein the first component carrier group is a PUCCH component carrier group, and
wherein the PUCCH component carrier group is configured to convey a PUCCH traffic and a non-PUCCH traffic.

16. A method of wireless communication performed at a user equipment, comprising:
transmitting first traffic using a first physical uplink control channel (PUCCH) group; and
transmitting second traffic using a second PUCCH group concurrently with transmitting the first traffic using the first PUCCH group,
wherein the first traffic is associated with a first service type, and
wherein the second traffic is associated with a second service type.

17. The method of claim 16,
wherein the first PUCCH group includes one or more first plurality of component carriers,
wherein the one or more first component carriers include a first PUCCH component carrier,
wherein the second PUCCH group includes one or more second component carriers, and
wherein the one or more second component carriers include a second PUCCH component carrier.

18. The method of claim 17,
wherein the one or more first component carriers further include a first non-PUCCH component carrier, and
wherein the one or more second component carriers further include a second non-PUCCH component carrier.

19. The method of claim 18,
wherein the first traffic is transmitted via the first PUCCH component carrier or the first non-PUCCH component carrier, and
wherein the second traffic is transmitted via the second PUCCH component carrier or the second non-PUCCH component carrier.

20. The method of claim 16, wherein the first traffic is associated with a physical uplink shared channel (PUSCH), and
wherein the PUSCH is conveyable using a PUCCH component carrier or using a non-PUCCH component carrier.

21. The method of claim 16, wherein the first traffic is associated with a PUCCH,
wherein the PUCCH is conveyable using only PUCCH component carriers.

22. The method of claim 16, wherein the first service type is enhanced mobile broadband (eMBB), and
wherein the second service type is ultra-reliable low latency communication (URLLC).

23. The method of claim 16, wherein the first traffic is associated with a PUCCH, and
wherein the second traffic is associated with a physical uplink shared channel (PUSCH).

24. The method of claim 16, wherein different component carriers are required to schedule the concurrent transmissions of the first traffic and the second traffic.

25. The method of claim 16, wherein the first PUCCH group includes a PUCCH component carrier and a non-PUCCH component carrier, and
wherein the first traffic is transmitted via the PUCCH component carrier or the non-PUCCH component carrier.

26. A non-transitory computer-readable medium storing a set of instructions, the set of instructions comprising:
one or more instructions that, when executed by one or more processors of a user equipment, cause the user equipment to:
transmit first traffic using a first physical uplink control channel (PUCCH) group; and
transmit second traffic using a second PUCCH group concurrently with transmitting the first traffic using the first PUCCH group,
wherein the first traffic is associated with a first service type, and
wherein the second traffic is associated with a second service type.

27. The non-transitory computer-readable medium of claim 26, wherein different component carriers are required to schedule the concurrent transmissions of the first traffic and the second traffic.

28. The non-transitory computer-readable medium of claim 26,
wherein the first PUCCH group includes a PUCCH component carrier and a non-PUCCH component carrier, and
wherein the first traffic is transmitted via the PUCCH component carrier or the non-PUCCH component carrier.

29. An apparatus for wireless communication, comprising:
means for transmitting first traffic using a first physical uplink control channel (PUCCH) group; and
means for transmitting second traffic using a second PUCCH group concurrently with transmitting the first traffic using the first PUCCH group, wherein the first traffic is associated with a first service type, and wherein the second traffic is associated with a second service type.

30. The apparatus of claim 29, wherein the first PUCCH group includes a PUCCH component carrier and a non-PUCCH component carrier, and wherein the first traffic is transmitted via the PUCCH component carrier or the non-PUCCH component carrier.

* * * * *